United States Patent
Tsuyuzaki et al.

(10) Patent No.: US 10,967,908 B2
(45) Date of Patent: Apr. 6, 2021

(54) VEHICLE BODY LOWER STRUCTURE

(71) Applicant: HONDA MOTOR CO., LTD., Tokyo (JP)

(72) Inventors: Takumi Tsuyuzaki, Wako (JP); Hiroyuki Ozawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 51 days.

(21) Appl. No.: 16/412,579

(22) Filed: May 15, 2019

(65) Prior Publication Data

US 2019/0359260 A1  Nov. 28, 2019

(30) Foreign Application Priority Data

May 25, 2018 (JP) ................................ 2018-100966

(51) Int. Cl.
| | | |
|---|---|---|
| *B62D 21/15* | (2006.01) | |
| *B60R 16/04* | (2006.01) | |
| *B62D 25/20* | (2006.01) | |

(52) U.S. Cl.
CPC ............ *B62D 21/157* (2013.01); *B60R 16/04* (2013.01); *B62D 25/2036* (2013.01)

(58) Field of Classification Search
CPC ......................... B62D 21/157; B62D 25/2036; B62D 25/025; B62D 25/20; B60R 16/04; H01M 2/1083; B60K 1/04; B60K 2001/0438
USPC .................................................. 296/187.08
See application file for complete search history.

(56) References Cited

U.S. PATENT DOCUMENTS

| | | | | |
|---|---|---|---|---|
| 9,045,030 | B2* | 6/2015 | Rawlinson | ............. B62D 25/20 |
| 2012/0160088 | A1* | 6/2012 | Rawlinson | ............. F41H 7/042 |
| | | | | 89/36.08 |
| 2012/0169089 | A1* | 7/2012 | Rawlinson | ......... B62D 25/2027 |
| | | | | 296/193.08 |
| 2013/0270863 | A1* | 10/2013 | Young | ..................... B60R 16/04 |
| | | | | 296/187.12 |
| 2016/0257346 | A1* | 9/2016 | Wu | ......................... B60K 1/04 |
| 2017/0217297 | A1* | 8/2017 | Li | ........................ B62D 25/025 |
| 2019/0009833 | A1* | 1/2019 | Yamagishi | ............. B62D 25/20 |
| 2019/0319233 | A1* | 10/2019 | Sawatzki | ................. B60K 1/04 |

FOREIGN PATENT DOCUMENTS

| | | |
|---|---|---|
| JP | 2011-121483 | 6/2011 |
| JP | 2014-019203 | 2/2014 |
| JP | 2015-150927 | 8/2015 |

OTHER PUBLICATIONS

Japanese Office Action for Japanese Patent Application No. 2018-100966 dated Oct. 29, 2019.

* cited by examiner

*Primary Examiner* — Pinel E Romain
(74) *Attorney, Agent, or Firm* — Amin, Turocy & Watson, LLP

(57) ABSTRACT

A vehicle body lower structure includes a pair of left and right side sills, a battery pack and a battery cross member. The battery pack accommodates a battery cell therein, and end portions in a vehicle width direction are coupled to the side sills while being disposed below a floor panel. The battery cross member is disposed inside the battery pack substantially in the vehicle width direction and extends further outward in the vehicle width direction than the battery cell. The battery cross member includes a first cross member and a second cross member extending further outward in the vehicle width direction than the first cross member.

6 Claims, 9 Drawing Sheets

VEHICLE BODY LOWER STRUCTURE

CROSS-REFERENCE TO RELATED APPLICATION

Priority is claimed on Japanese Patent Application No. 2018-100966, filed May 25, 2018, the content of which is incorporated herein by reference.

BACKGROUND OF THE INVENTION

Field of the Invention

The present invention relates to a vehicle body lower structure in which a battery pack configured to accommodate a battery cell is disposed below a floor panel.

Description of Related Art

As a vehicle body lower structure, a structure in which a battery pack configured to accommodate a plurality of battery cells therein is disposed below a floor panel of a vehicle and both end portions of the battery pack in a vehicle width direction bridge between a pair of side sills below a side portion of a vehicle body is known (for example, see Japanese Unexamined Patent Application, First Publication No. 2011-121483).

In the vehicle body lower structure disclosed in Japanese Unexamined Patent Application, First Publication No. 2011-121483, a battery cross member extending substantially in a vehicle width direction is attached integrally to the battery pack, and both end portions of the battery cross member in the vehicle width direction are coupled to the left and right side sills of the vehicle body. In the vehicle body lower structure, when an impact load is input to the side sills from a side of the vehicle body, the impact load is transmitted to a central region of the vehicle body in the vehicle width direction through the battery cross member and the battery cells in the battery pack are protected by the battery cross member.

SUMMARY OF THE INVENTION

However, in the vehicle body lower structure disclosed in Japanese Unexamined Patent Application, First Publication No. 2011-121483, since the battery cross member attached to the battery pack is formed to have a substantially constant strength throughout the region in the vehicle width direction, when the strength of the battery cross member is increased to protect the battery cells in the battery pack, it is difficult to sufficiently obtain a shock absorbing function by the battery cross member. In addition, on the contrary, when the strength of the battery cross member is set to a low level to sufficiently obtain the shock absorbing function using the battery cross member, a protection function with respect to the battery cells in the battery pack is decreased.

An aspect of the present invention is directed to providing a vehicle body lower structure capable of sufficiently absorbing energy of an impact load using a battery cross member when the impact load is input from a side of a vehicle body and stably protecting battery cells using the battery cross member.

A vehicle body lower structure according to the present invention employs the following configurations.

(1) A vehicle body lower structure according to the present invention includes a pair of left and right side sills disposed below a side portion of a vehicle body and extending substantially in a vehicle body forward/rearward direction; a battery pack configured to accommodate a battery cell therein and having both end portions in a vehicle width direction fixed to the side sills while being disposed below a floor panel; and a battery cross member that is disposed inside the battery pack substantially in the vehicle width direction and that extends further outward in the vehicle width direction than the battery cell inside of the battery pack, wherein the battery cross member includes a first cross member and a second cross member extending further outward in the vehicle width direction than the first cross member.

According to the configuration of the above-mentioned (1), when an impact load is input to the side sill from a side of the vehicle body, the impact load is first transmitted to the second cross member of the battery cross member, and then, the second cross member is deformed. Energy of an impact load input to the side sill is absorbed when the second cross member is deformed. In addition, when the second cross member is deformed to a predetermined amount or more, deformation to the amount or more is restricted by the first cross member. As a result, application of an impact load input to the side sill applied to the battery cell in the battery pack is suppressed.

(2) In the aspect of the above-mentioned (1), the first cross member may be constituted by a member having strength in the vehicle width direction higher than that of the second cross member.

In this case, when an impact load from a side of the vehicle body is input, energy of the impact load is absorbed when the second cross member having low strength in the vehicle width direction is deformed, and the first cross member having high strength in the vehicle width direction restricts excessive deformation of the battery pack toward an inner side in the vehicle width direction. Accordingly, when the configuration is employed, sufficient absorption of energy of an impact load and secure protection of the battery cell in the battery pack can be further achieved.

(3) In the aspect of the above-mentioned (1) or (2), a weak section may be provided on an end portion of the second cross member on an outer side in the vehicle width direction.

In this case, when an impact load is input to an end portion of the second cross member on an outer side in the vehicle width direction, the weak section triggers deformation, and the second cross member is easily deformed.

(4) In any one aspect of the above-mentioned (1) to (3), the first cross member may have a first flange that extends in the vehicle body forward/rearward direction from an end portion of the first cross member on an outer side in the vehicle width direction and fixed to a bottom wall of the battery pack.

In this case, even when the first cross member has the extension length in the vehicle width direction smaller than that of the second cross member, since the end portion of the first cross member on an outer side in the vehicle width direction is fixed to the bottom wall of the battery pack at the first flange extending in the vehicle body forward/rearward direction, the impact load input from a side of the vehicle body can be firmly received.

(5) In any one aspect of the above-mentioned (1) to (5), the second cross member may have a second flange extending in the vehicle body forward/rearward direction from an end portion of the second cross member on an outer side in the vehicle width direction and fixed to a sidewall of the battery pack on an outer side in the vehicle width direction.

In this case, when an impact load is input to the sidewall of the battery pack on an outer side in the vehicle width direction from a side of the vehicle body, the impact load is input to the second cross member through the second flange. Accordingly, the second cross member is stably deformed. In addition, when an impact load input from a side of the vehicle body is relatively small, large inward deformation in the vehicle width direction of the sidewall of the battery pack on an outer side in the vehicle width direction can be restricted by the second flange. For this reason, contacts of the sidewalls of the battery pack with the battery cell can be minimized, and the battery cell can be protected.

(6) In the aspect of the above-mentioned (5), the first cross member may have a first flange that extends in the vehicle body forward/rearward direction and that is fixed to a bottom wall of the battery pack, and the first flange may be formed to have an extension length in the vehicle body forward/rearward direction larger than that of the second flange.

In this case, since the extension length of the first flange in the vehicle body forward/rearward direction is larger than the extension length of the second flange in the vehicle body forward/rearward direction, attachment strength of the first flange with respect to the battery pack can be larger than attachment strength of the second flange with respect to the battery pack. For this reason, even when an impact load input from a side of the vehicle body is large, excessive deformation of the battery pack can be securely restricted by the first cross member, and the battery cell can be stably protected.

According to the aspect of the present invention, since the battery cross member includes the first cross member and the second cross member extending further outward in the vehicle width direction than the first cross member, when an impact load from a side of the vehicle body is input, energy of the impact load can be sufficiently absorbed by the second cross member, and the battery cell can be stably protected by the first cross member.

DETAILED DESCRIPTION OF THE INVENTION

Figure 1:
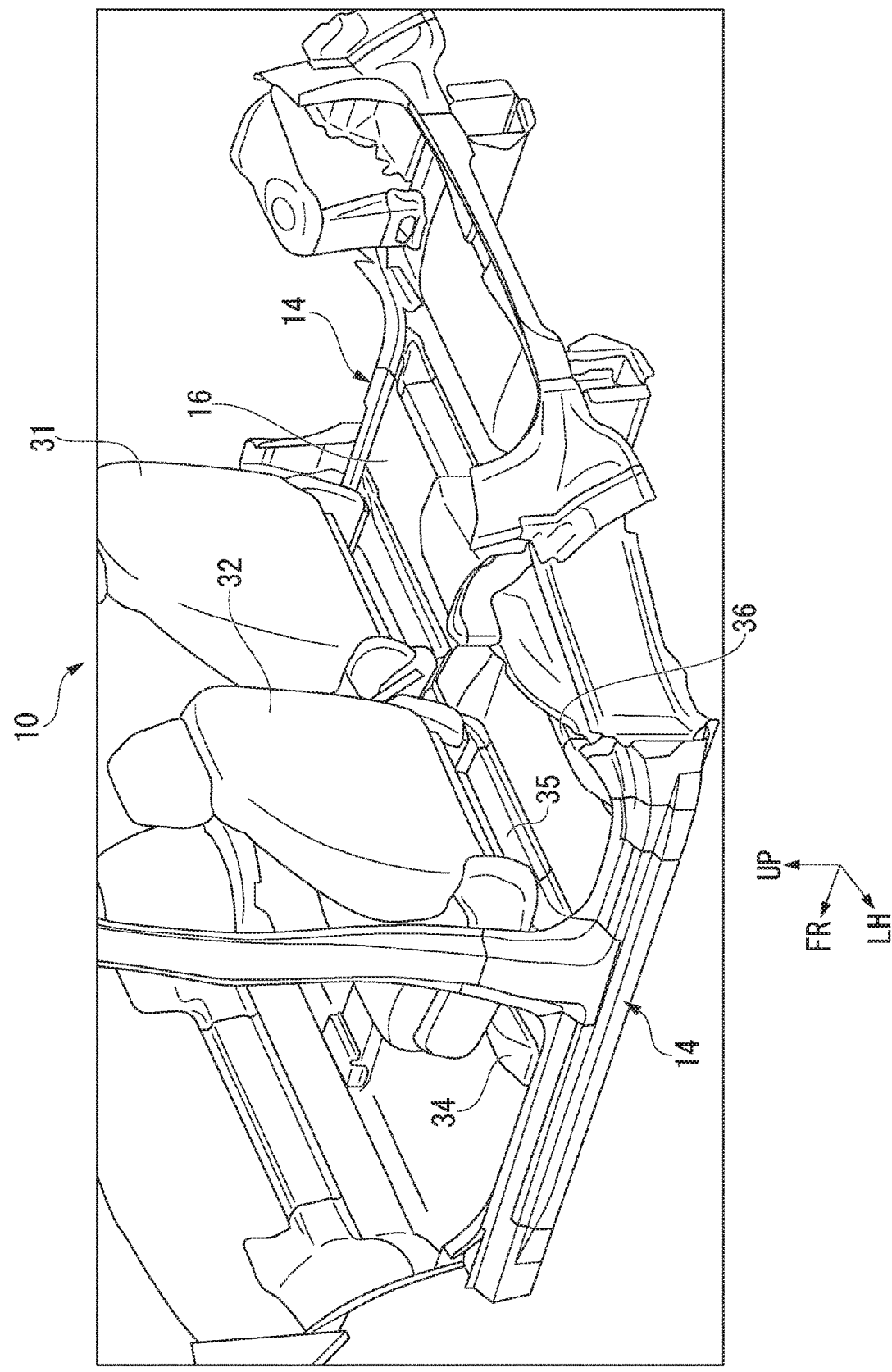
FIG. 1 is a perspective view showing a skeleton section of a vehicle according to the embodiment of the present invention.

Hereinafter, an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

Figure 2:
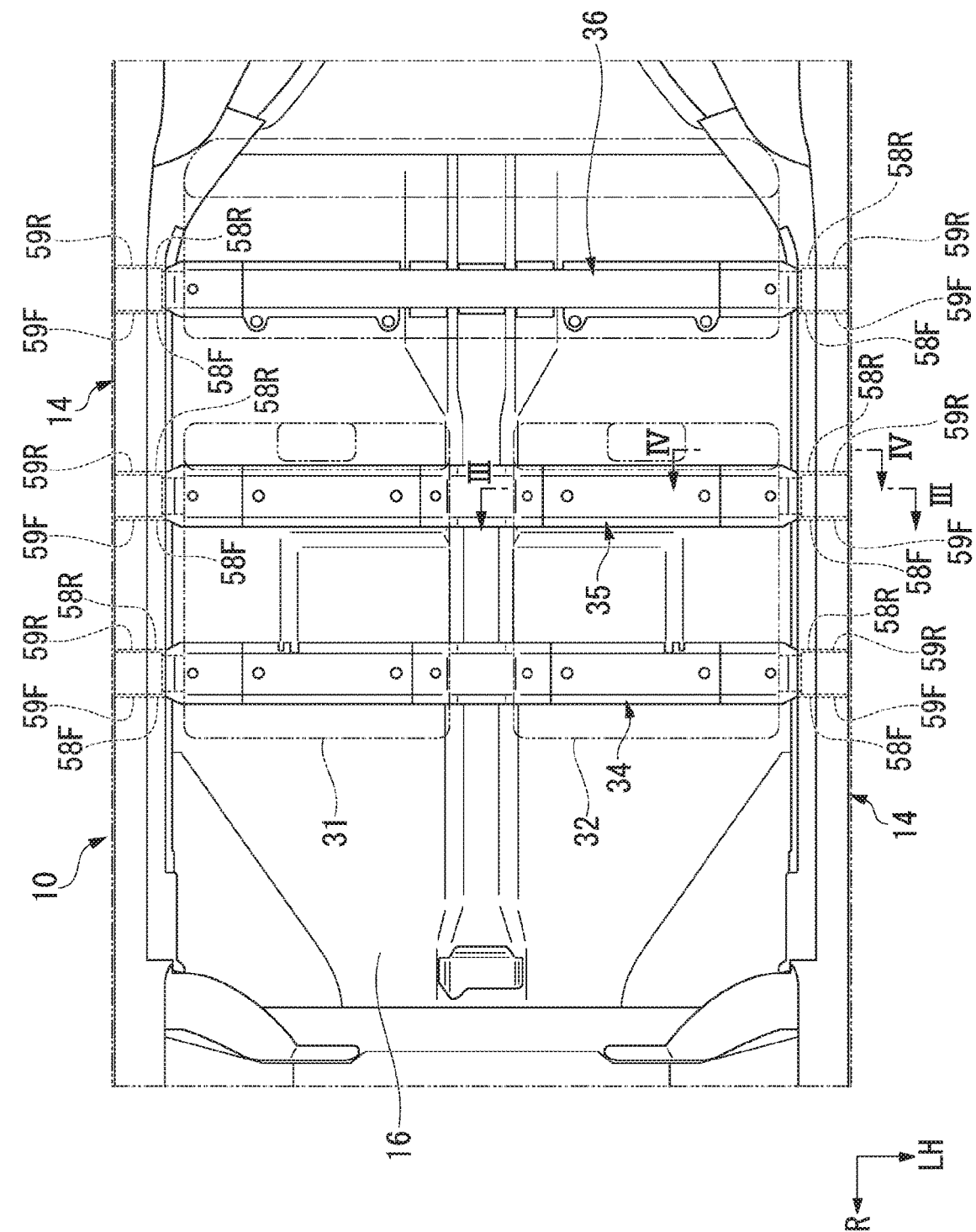
FIG. 2 is a plan view showing a vehicle body lower structure of the embodiment of the present invention.
Figure 3:
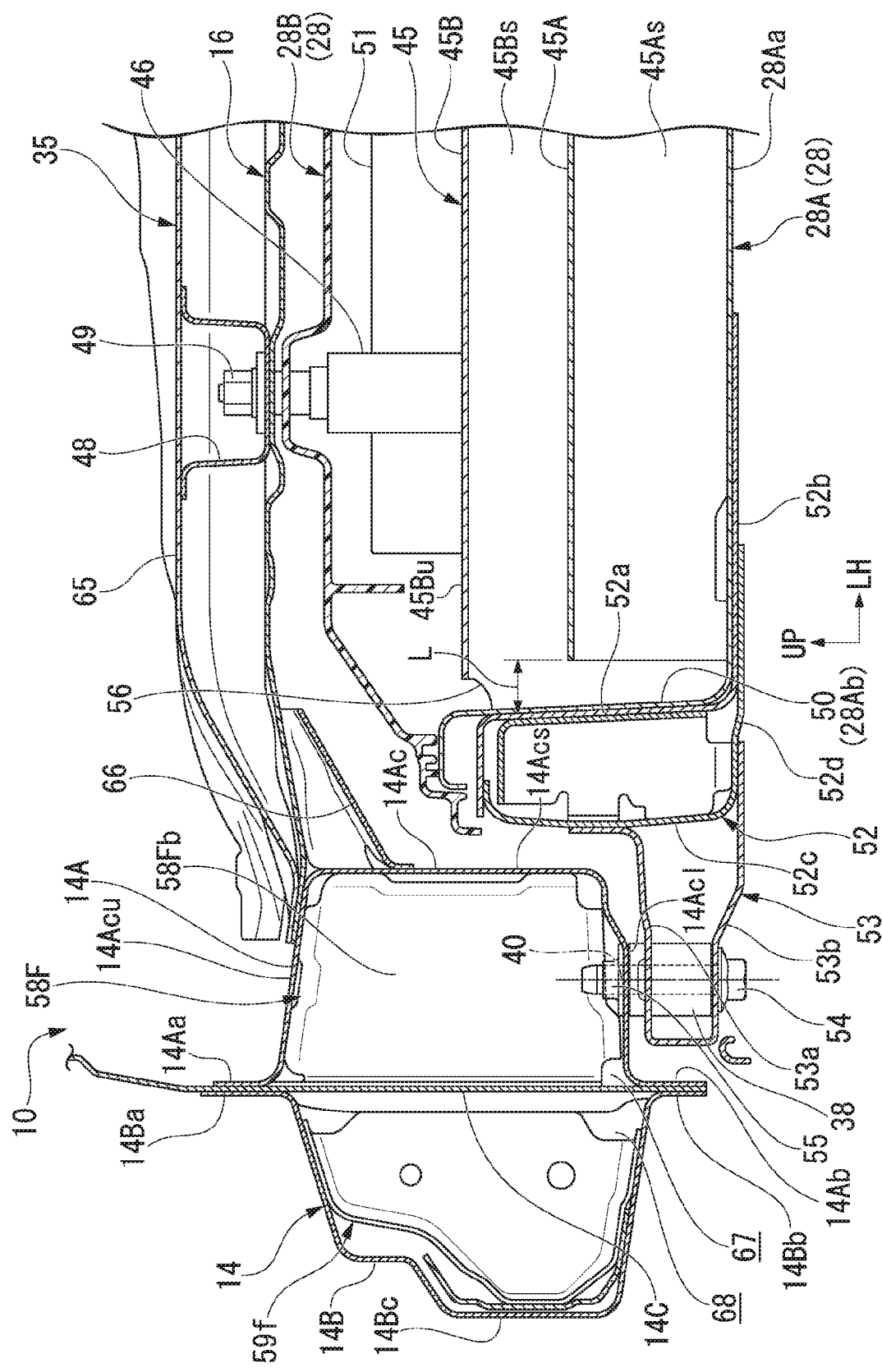
FIG. 3 is a cross-sectional view of the vehicle body lower structure according to the embodiment of the present invention taken along line in FIG. 2.
Figure 4:
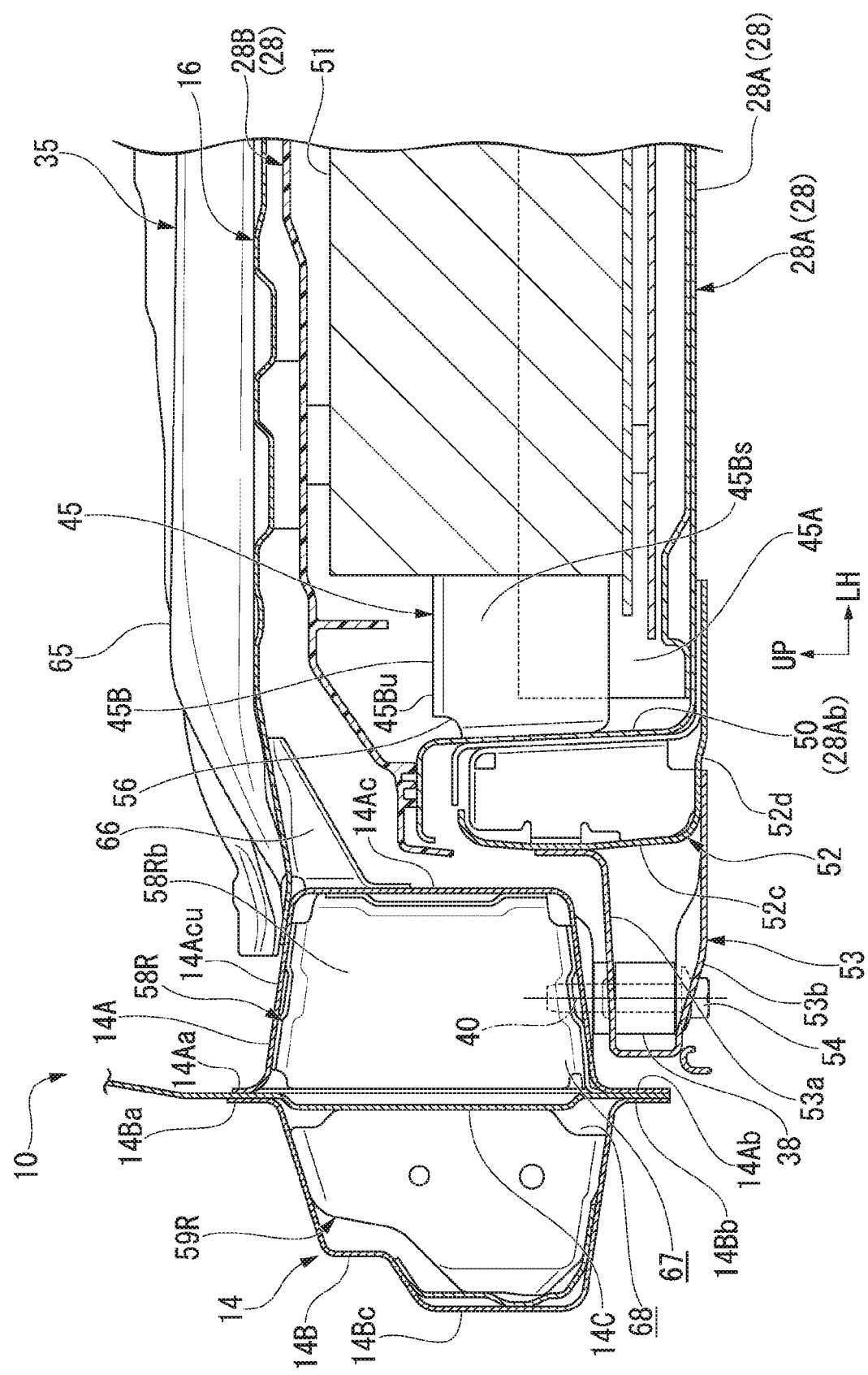
FIG. 4 is a cross-sectional view of the vehicle body lower structure according to the embodiment of the present invention taken along line IV-IV in FIG. 2.

FIG. 1 is a view showing a skeleton section of a vehicle 10 of the embodiment from obliquely above a rear left side, and FIG. 2 is a view showing a vehicle body lower structure of the vehicle 10 of the embodiment from above. In addition, FIG. 3 is a cross-sectional view of the vehicle body lower structure in FIG. 2 taken along line and FIG. 4 is a cross-sectional view of the vehicle body lower structure in FIG. 2 taken along line IV-IV.

The vehicle body lower structure of the embodiment includes a pair of left and right side sills 14, which are strengthening members disposed at lower end side portions of the vehicle. The left and right side sills 14 extend substantially in a forward/rearward direction of the vehicle body.

The vehicle body lower structure of the embodiment includes the pair of side sills 14, a floor panel 16 having both end portions in a vehicle width direction that bridge between the left and right side sills 14, a plurality of floor cross members 34, 35 and 36 having main parts disposed on an upper surface side of the floor panel 16, a battery pack 28 (see FIG. 3 and FIG. 4) bridged between the left and right side sills 14 below the floor panel 16, and a plurality of battery cross members 45 installed in the battery pack 28. In the case of the embodiment, a driver seat 31 installed in a passenger compartment and installation sections in front of and behind a passenger seat 32 are attached to the two front floor cross members 34 and 35.

All of the floor cross members 34, 35 and 36 extend substantially in the vehicle width direction, lower ends thereof are joined to an upper surface of the floor panel 16, and both end portions in an extension direction are coupled to the left and right side sills 14. The floor cross members 34, 35 and 36 are disposed to be separated in the vehicle body forward/rearward direction.

Figure 5:
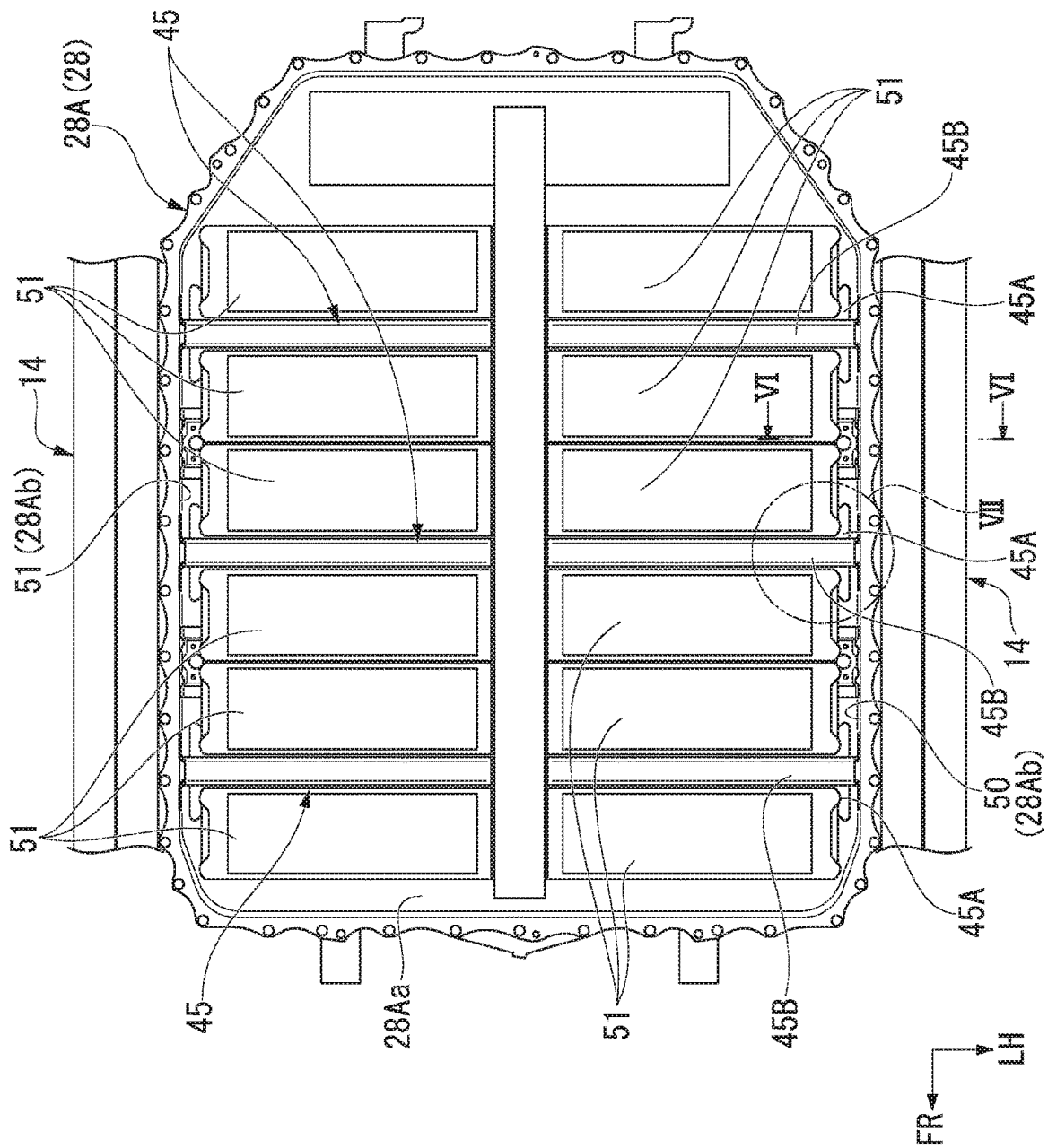
FIG. 5 is a plan view in which a floor panel of the vehicle body lower structure according to the embodiment of the present invention and a pack cover of a battery pack are removed.
Figure 6:
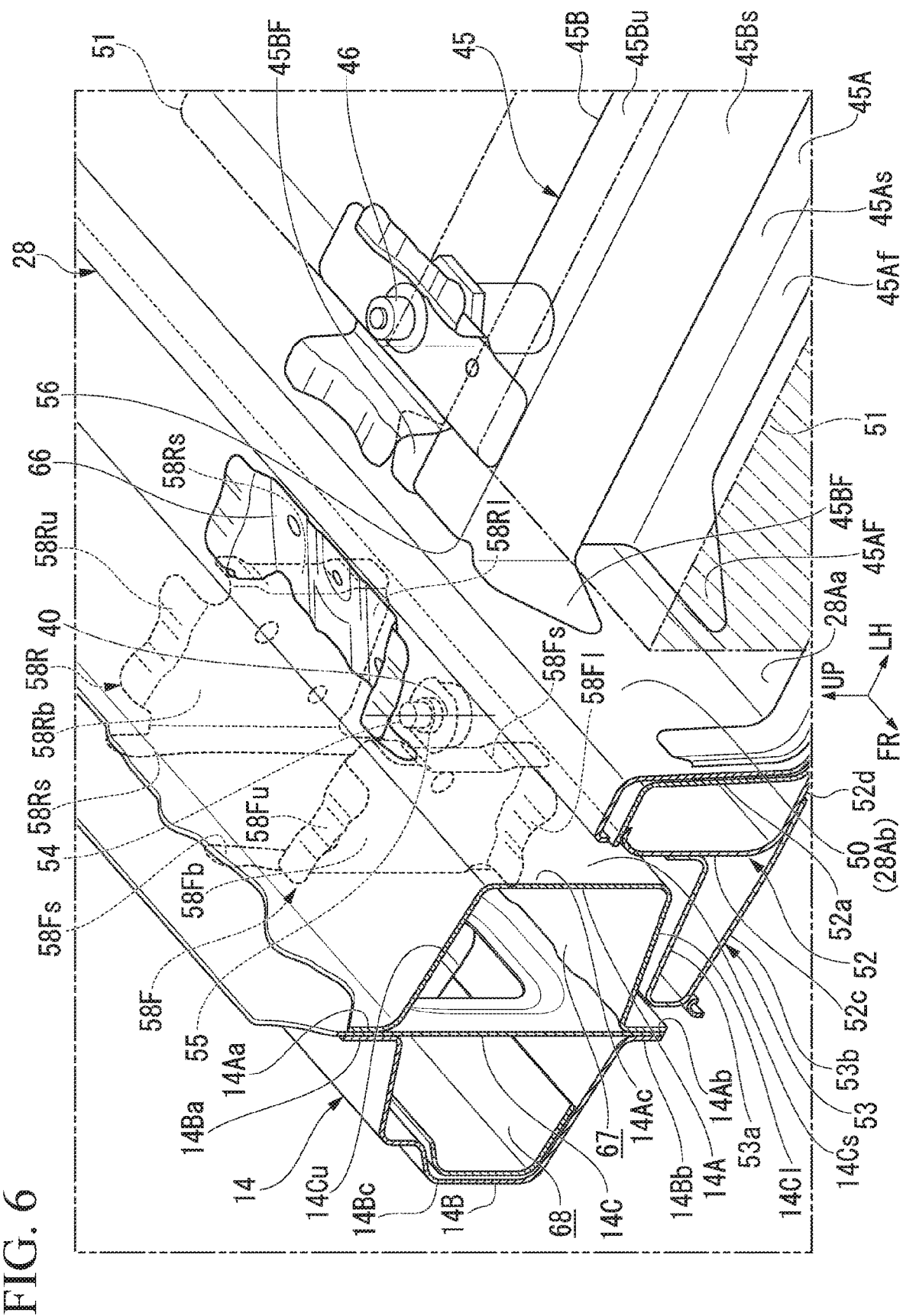
FIG. 6 is a partially cross-sectional perspective view of the vehicle body lower structure according to the embodiment of the present invention taken along line VI-VI in FIG. 5.
Figure 7:
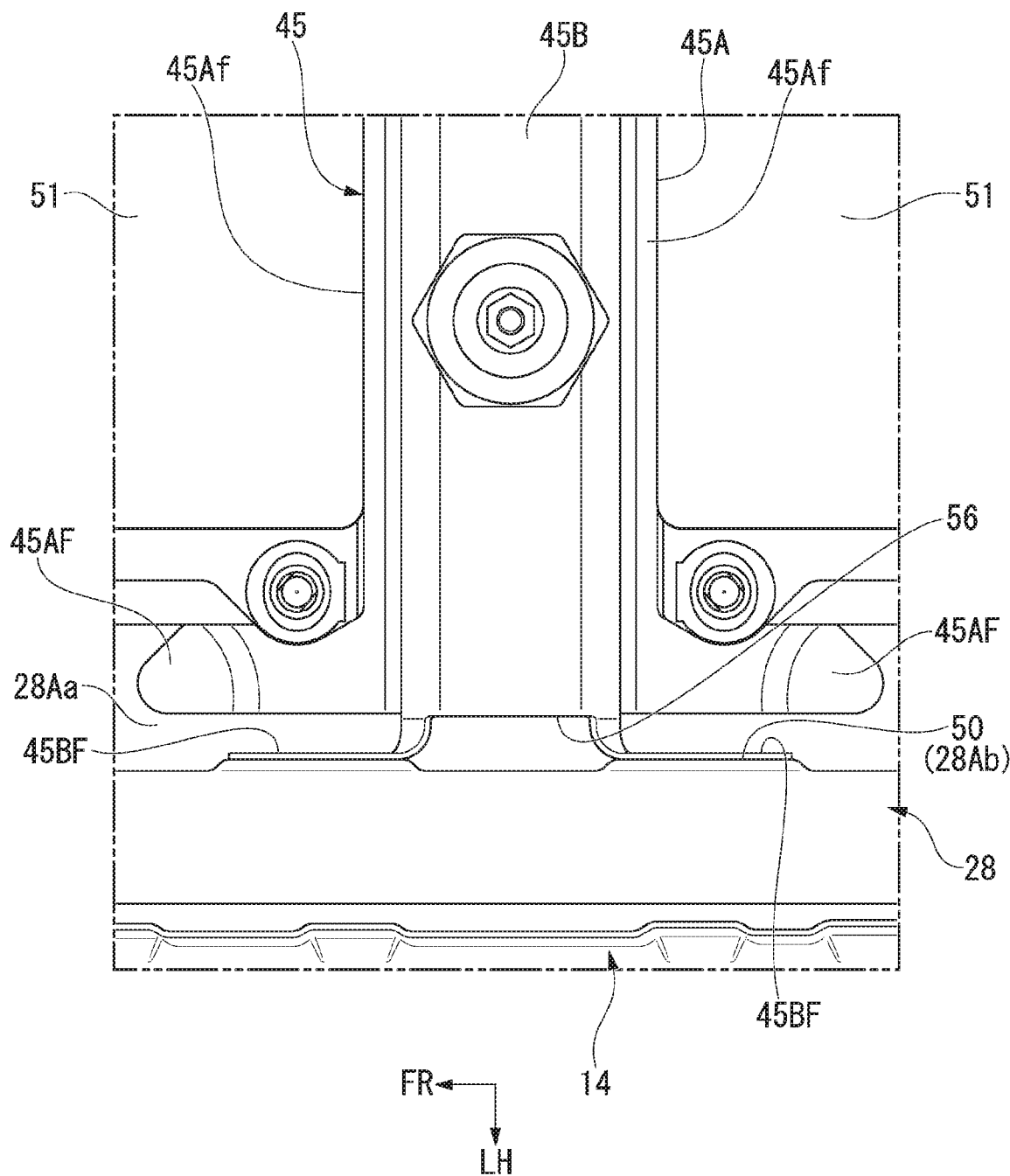
FIG. 7 is an enlarged plan view of a portion VII in FIG. 5 of the vehicle body lower structure of the embodiment of the present invention.

FIG. 5 is a view showing the vehicle body lower structure, from which the floor panel 16, a pack cover 28B of the battery pack 28, or the like, is removed, from above. FIG. 6 is a partial cross-sectional perspective view of the vehicle body lower structure shown in FIG. 5 taken along line VI-VI, and FIG. 7 is an enlarged view showing a portion VII in FIG. 5.

The battery pack 28 includes a pack main body 28A that opens upward, and the pack cover 28B that closes an opening of an upper section of the pack main body 28A. The pack main body 28A includes a bottom wall 28Aa formed in a substantially rectangular shape when seen in a plan view, and a circumferential wall 28Ab standing upward from a circumferential region of the bottom wall 28Aa. Portions of the circumferential wall 28Ab standing upward from left and right side end portions are referred to as sidewalls 50 hereinafter.

A plurality of battery cells 51 and the plurality of battery cross members 45 extending substantially in the vehicle width direction to partition the inside of the battery pack 28 into front and rear parts are disposed in the battery pack 28. In the case of the embodiment, three battery cross members 45 are provided. The battery cross members 45 are disposed immediately below the floor cross members 34, 35 and 36 above the floor panel 16, respectively. The three floor cross members 34, 35 and 36 and the battery cross members 45 are disposed substantially parallel to each other.

Cross sections including the battery cross members 45 corresponding to the floor cross members 34, 35 and 36, respectively, (cross sections substantially perpendicular to the forward/rearward direction of the vehicle) have substantially the same structure. For this reason, as described below, a cross-sectional structure of a lower section of the vehicle body will be described with reference to a representative cross sections including the floor cross member 35 at a center in the forward/rearward direction and the battery cross members 45.

As shown in FIG. 3, FIG. 4 and FIG. 6, a prismatic side frame 52 extending substantially in the vehicle body forward/rearward direction is coupled to outer surfaces of the sidewalls 50 of the pack main body 28A. The side frame 52 is formed in a longitudinal rectangular cross-sectional shape having a vertical height slightly smaller than that of the pack main body 28A.

The side frame 52 has an inside sidewall 52a that is joined to the sidewalls 50 of the pack main body 28A and that has a lower end bent toward an inner side in the vehicle width direction, and an extension piece 52b is provided at a tip of the bent section thereof. The extension piece 52b overlaps a lower surface of the bottom wall 28Aa of the pack main body 28A and is joined to the lower surface of the bottom wall 28Aa. In addition, a bottom wall 52d connected to a sidewall 52c of the side frame 52 on an outer side extends until a lower surface of the extension piece 52b, and is joined to the bottom wall 28Aa of the pack main body 28A together with the extension piece 52b through welding or the like.

In addition, an attachment frame 53 protruding outward from a lower region of the side frame 52 in the vehicle width direction is coupled to an outer side of the side frame 52 in the vehicle width direction. The attachment frame 53 forms a lateral rectangular cross section together with a sidewall of the side frame 52 on an outer side while being coupled to the side frame 52. The rectangular cross section extends substantially in the vehicle body forward/rearward direction. In the attachment frame 53, an end portion of an upper wall 53a on an inner side in the vehicle width direction is bent upward to be joined to the sidewall 52c of the side frame 52 on an outer side, and a lower wall 53b extends downward until the bottom wall 52d of the side frame 52 to be joined to the lower surface of the bottom wall 52d.

The attachment frame 53 overlaps inner lower surfaces of the left and right side sills 14, and is coupled to lower walls of the side sills 14 by a bolt 54 and a nut 55 that are fastening members. The bolt 54 vertically passes through the lower wall 53b and the upper wall 53a of the attachment frame 53, and a tip portion thereof is screwed to the nut 55 fixed in the side sill 14. Further, a collar 38 through which a shaft section of the bolt 54 is inserted is disposed in the attachment frame 53. The collar 38 increases rigidity of a bolt fastening section of the attachment frame 53 when the collar 38 is disposed inside the attachment frame 53. The fastening section constituted by the bolt 54 and the nut 55 constitute fixing points 40 of the side sills 14 to the battery pack 28.

As shown in FIG. 3, upper walls of the battery cross members 45 are coupled to the floor panel 16 and the floor cross member 35 on an upper side by a stud bolt 46 that is a fastening member.

Specifically, a bracket 48 having a substantially C-shaped cross section is joined to a lower surface of an upper wall of the floor cross member 35, and a screw section of an upper section of the stud bolt 46 passes upward through the floor panel 16 and the bracket 48. Then, a nut 49 is fastened to the screw section passing upward through the bracket 48. Further, the pack cover 28B configured to cover the pack main body 28A from above is locked to the stud bolt 46.

Here, the floor cross member 35 includes a cross plate 65 joined to an upper surface of the floor panel 16 and forming a closed cross section extending substantially in the vehicle width direction between the floor panel 16 and the cross plate 65, and a gusset plate 66 that bridges between a lower surface of an end region of the floor panel 16 in the vehicle width direction and the inner surfaces of the side sills 14 and forms a closed cross section extending substantially in the vehicle width direction between the floor panel 16 and the gusset plate 66. The cross plate 65 has a cross section formed in substantially a hat shape, and both end portions in the vehicle width direction are joined to upper surfaces of the left and right side sills 14 together with the floor panel 16. The gusset plate 66 has a cross section formed in a substantially downward hat shape, and both end portions in the vehicle width direction are joined to a lower surface of the floor panel 16 and side surfaces of the side sills 14 on an inner side in the vehicle width direction (side surface of a sidewall 14Acs). In the embodiment, the gusset plate 66 constitutes a connecting member configured to connect the floor panel 16 and the side surfaces of the side sills 14 on an inner side in the vehicle width direction.

An upper wall of an end region of the cross plate 65 in the vehicle width direction is inclined downward toward an outer side in the vehicle width direction. Accordingly, in the closed cross section formed by the cross plate 65 and the upper surface of the floor panel 16, an internal opening area gradually narrows outward in the vehicle width direction. In addition, a lower wall of the gusset plate 66 is also similarly inclined downward toward an outer side in the vehicle width direction. Accordingly, in a closed cross section formed by the gusset plate 66 and the lower surface of the floor panel 16, an internal opening area gradually widens outward in the vehicle width direction.

In the floor cross member 35, a central region in the vehicle width direction is formed to be lifted upward with respect to the side sills 14. However, in the floor cross member 35, according to the configuration, a closed cross section of a central region formed by the floor panel 16 and the cross plate 65 and an inclined closed cross section of the end region formed by the cross plate 65 and the gusset plate 66 are connected as a substantially constant cross-sectional area.

Figure 8:
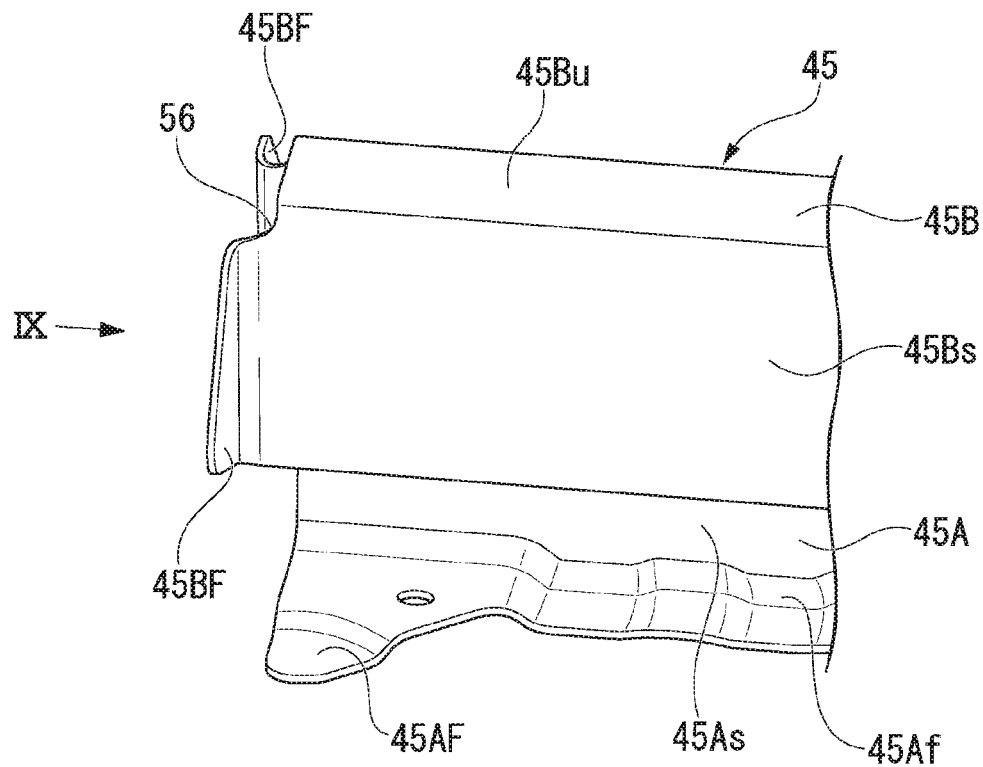
FIG. 8 is a perspective view of a battery cross member according to the embodiment of the present invention.
Figure 9:
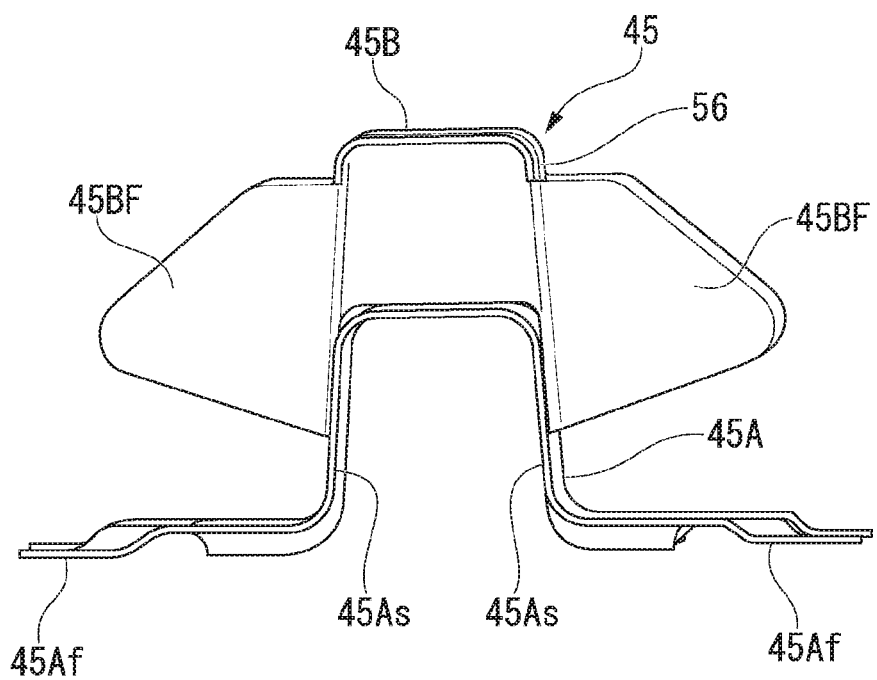
FIG. 9 is a view of the battery cross member according to the embodiment of the present invention taken along an arrow IX in FIG. 8.
Figure 10:
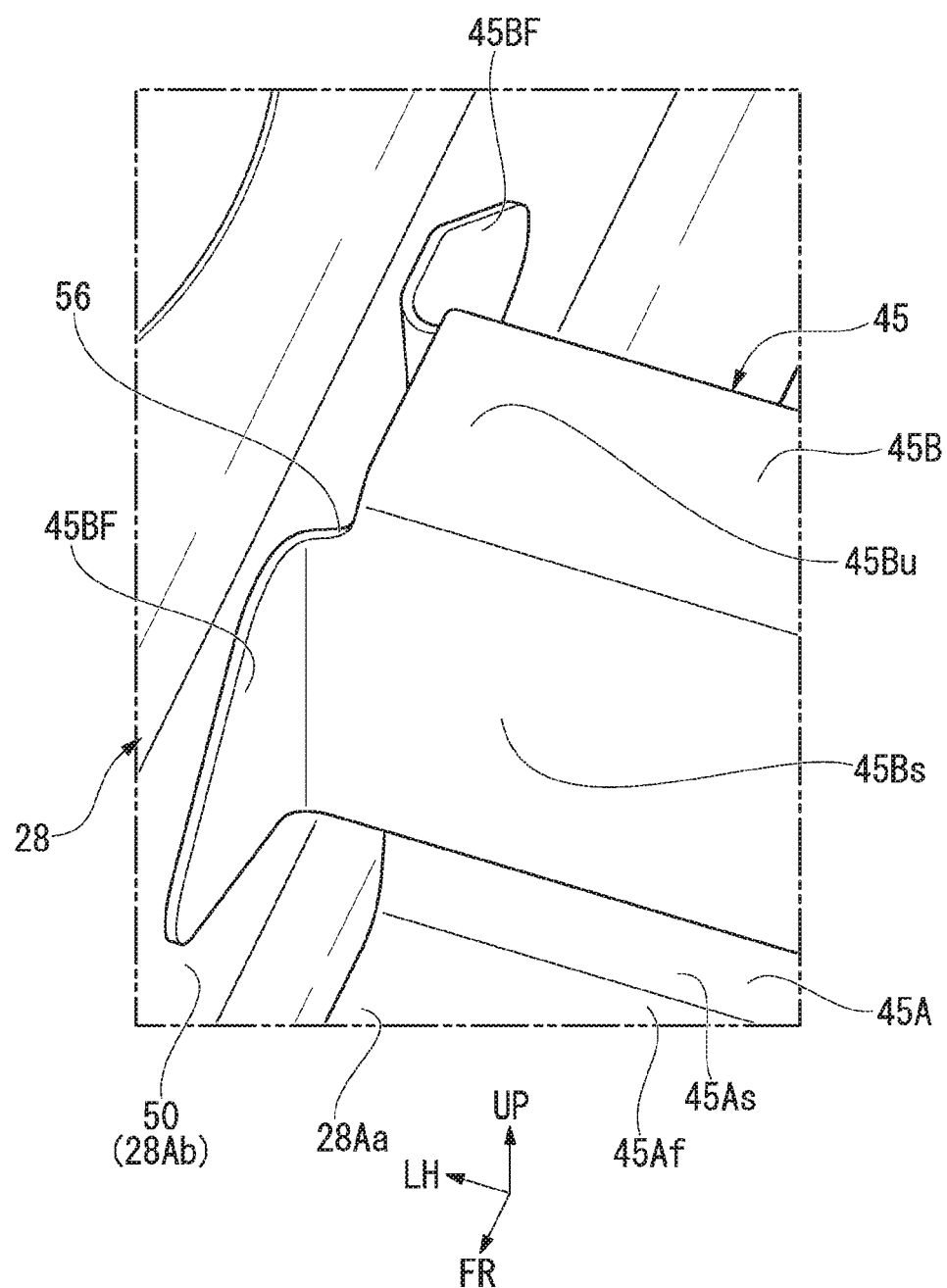
FIG. 10 is a perspective view showing a joining section between a second cross member and a battery pack according to the embodiment of the present invention.

FIG. 8 is a view showing the vicinity of the end portions of the battery cross members 45 in the vehicle width direction from an inclined upper side, and FIG. 9 is a view showing the battery cross members 45 taken along an arrow IX in FIG. 8. In addition, FIG. 10 is a view showing a joining section between the end portion of the battery cross member 45 and the sidewall 50 of the battery pack 28 from an inclined upper side.

The battery cross members 45 include a first cross member 45A having a substantially hat-shaped cross section extending substantially in the vehicle width direction, and a second cross member 45B having a substantially C-shaped cross section, extending substantially in the vehicle width direction and coupled integrally to the upper section of the first cross member 45A.

In the first cross member 45A, a base flange 45Af is continuously provided on lower ends of front and rear sidewalls 45As, and the base flange 45Af is joined to the upper surface of the bottom wall 28Aa of the battery pack 28 through welding or the like. In addition, as shown in FIG. 7, the first cross member 45A is formed to an extension length that does not reach the sidewalls 50 of the battery pack 28 (a length in the vehicle width direction) when the first cross member 45A is installed in the battery pack 28. However, as shown in FIG. 3 and FIG. 7, the first cross member 45A is formed to a length protruding further outward in the vehicle width direction than the battery cells 51 in the battery pack 28 when the first cross member 45A is installed in the battery pack 28.

In addition, first flanges 45AF protruding from the front and rear sidewalls 45As more largely than the base flange 45Af in the forward/rearward direction extend from the end portions of the first cross member 45A on outer sides in the vehicle width direction. More specifically, the first flanges 45AF extending to be bent toward a front side of the vehicle body extend from a lower end of the sidewall 45As of the first cross member 45A on a front side, and the first flanges 45AF extending to be bent toward a rear side of the vehicle body extend from a lower end of the sidewall 45As of the first cross member 45A on a rear side. The first flanges 45AF are joined to an upper surface of the bottom wall 28Aa of the battery pack 28 through welding or the like.

In the second cross member 45B, lower edge portions of front and rear sidewalls 45Bs overlap outer surfaces of the front and rear sidewalls 45As of the first cross member 45A, and the sidewalls 45Bs and 45As are joined to each other through welding or the like in this state. In addition, the second cross member 45B has an extension length in the vehicle width direction that is set to be longer than an extension length of the first cross member 45A in the vehicle width direction. Then, an end portion of the second cross member 45B in the vehicle width direction joined to the first cross member 45A protrudes further outward in the vehicle width direction by a predetermined length L (see FIG. 3) than the end portion of the first cross member 45A in the vehicle width direction.

Second flanges 45BF extending from the front and rear sidewalls 45Bs to be bent in the vehicle body forward/rearward direction extend from end portions of the second cross member 45B on outer sides in the vehicle width direction. More specifically, the second flange 45BF extending to be bent toward a front side of the vehicle body extends from the sidewall 45Bs of the second cross member 45B on a front side, and the second flange 45BF extending to be bent toward a rear side of the vehicle body extends from the sidewall 45Bs of the second cross member 45B on a rear side. The second flanges 45BF are joined to the inner surfaces of the sidewalls 50 of the battery pack 28 through welding or the like.

Further, as shown in FIG. 7, the first flanges 45AF of the first cross member 45A is formed to have an extension length in the vehicle body forward/rearward direction that is larger than that of the second flanges 45BF of the second cross member 45B.

A continuous notch section 56 is provided in portions of upper regions of the front and rear sidewalls 45Bs and an upper wall 45Bu among an edge of the second cross member 45B on an outer side in the vehicle width direction. Thus, when the notch section 56 is provided on the edge of the second cross member 45B on an outer side in the vehicle width direction, the vicinity of the root section of the second flange 45BF among the edge of the second cross member 45B on an outer side in the vehicle width direction is considered to be weak with respect to an input load. In the embodiment, a portion in which the notch section 56 is formed constitutes a weak section. When an impact load is input from a side of the vehicle body to an end portion of the second cross member 45B on an outer side in the vehicle width direction, the second cross member 45B is likely to be crushed and deformed around the notch section 56 of the end portion.

In addition, the first cross member 45A is constituted by a member having a strength that is higher than that of the second cross member 45B in the vehicle width direction. Specifically, the first cross member 45A is constituted by a metal plate having a thickness larger than that of the second cross member 45B. Further, the first cross member 45A may be formed of a material having strength higher than that of the second cross member 45B.

Incidentally, as shown in FIG. 3, FIG. 4 and FIG. 6, the side sills 14 disposed at side portions of the vehicle body are configured by sandwiching a stiffener 14C between a side sill inner portion 14A and a side sill outer portion 14B having a hat-shaped cross section. The side sill inner portion 14A includes upper and lower joining flanges 14Aa and 14Ab, and an inner protruding section 14Ac having a substantially C-shaped cross section and protruding from base sections of the joining flanges 14Aa and 14Ab toward an inner side in the vehicle width direction. The side sill outer portion 14B includes upper and lower joining flanges 14Ba and 14Bb, and an outer protruding section 14Bc having a substantially C-shaped cross section and protruding from base sections of the joining flanges 14Ba and 14Bb toward an outer side in the vehicle width direction. The stiffener 14C is formed in a flat plate shape, and coupled to the upper and lower joining flanges 14Aa, 14Ba, 14Ab and 14Bb of the side sill inner portion 14A and the side sill outer portion 14B through welding or the like in a state in which the stiffener 14C is interposed between the side sill inner portion 14A and the side sill outer portion 14B. The inside of the side sill 14 is partitioned into an inner closed space 67 and an outer closed space 68 by the stiffener 14C, and the cross section is reinforced by the stiffener 14C.

Further, the fixing points 40 of the side sills 14 to the battery pack 28 (a fastening section by the bolt 54 and the nut 55) is disposed on a lower wall 14Acl of the side sill inner portion 14A (the lower wall 14Acl of the inner protruding section 14Ac) facing the inner closed space 67.

A first inner bulkhead 58F and a second inner bulkhead 58R are disposed in the inner closed space 67 of the side sills 14 while having the fixing points 40 to the battery pack 28 sandwiched there between in the front and rear sides (front and rear sides in the vehicle body forward/rearward direction). In the embodiment, the first inner bulkhead 58F and the second inner bulkhead 58R constitute a bulkhead configured to reinforce the cross section of the side sills 14 from the inside.

In the first inner bulkhead 58F, an upper flange 58Fu, a lower flange 58Fl and inner and outer side flanges 58Fs in the vehicle width direction extend to be bent at a substantially right angle from an outer edge portion of a bulkhead main body 58Fb configured to partition the inner closed space 67 into front and rear sections in front of the fixing points 40. The upper flange 58Fu is joined to an upper wall 14Acu of the inner protruding section 14Ac of the side sill inner portion 14A, and the lower flange 58Fl is joined to lower wall 14Acl of the inner protruding section 14Ac of the side sill inner portion 14A. In addition, the inner and outer side flanges 58Fs in the vehicle width direction are joined to the inner side surface of the stiffener 14C and the sidewall 14Acs of the inner protruding section 14Ac.

Similarly, in the second inner bulkhead 58R, an upper flange 58Ru, a lower flange 58Rl and inner and outer side flanges 58Rs in the vehicle width direction extend to be bent at a substantially right angle from an outer edge portion of a bulkhead main body 58Rb configured to partition the inside of the inner closed space 67 into front and rear parts on a rear side of the fixing points 40. The upper flange 58Ru is joined to the upper wall 14Acu of the inner protruding section 14Ac of the side sill inner portion 14A, and the lower flange 58Rl is joined to the lower wall 14Acl of the inner protruding section 14Ac of the side sill inner portion 14A. The inner and outer side flanges 58Rs in the vehicle width direction are joined to the inner side surface of the stiffener 14C and the sidewall 14Acs of the inner protruding section 14Ac, respectively.

In addition, a first outer bulkhead 59F and a second outer bulkhead 59R are disposed in the outer closed space 68 of the side sills 14. The first outer bulkhead 59F and the second outer bulkhead 59R are joined to the outer protruding section 14Bc of the side sill outer portion 14B and the stiffener 14C at outer positions in the vehicle width direction of the first inner bulkhead 58F and the second inner bulkhead 58R in the inner closed space 67. Accordingly, the first outer bulkhead 59F and the second outer bulkhead 59R reinforce front and rear positions of the fixing points 40 in the side sills 14 together with the first inner bulkhead 58F and the second inner bulkhead 58R.

Further, the fixing points 40 on the side sills 14 and the first inner bulkhead 58F and the second inner bulkhead 58R disposed in front of and behind the fixing points 40 are disposed on an outer position of the gusset plate 66 (the connecting member) in the vehicle width direction that constitutes a part of the floor cross member 35.

In the above-mentioned configuration, when an impact load is input to the vehicle 10 of the embodiment from a side of the vehicle body to the side sills 14, the impact load is transmitted to the sidewalls 50 in the battery pack 28 from the fixing points 40 of the side sills 14 through the side frame 52 and the attachment frame 53. The impact load transmitted to the sidewalls 50 is transmitted to a central region in the vehicle width direction through the second cross member 45B and the first cross member 45A of the battery cross members 45. Here, the second cross member is crushed and deformed first, and energy of an impact load is absorbed during crush deformation. In addition, when the second cross member is deformed to a predetermined amount or more in the vehicle width direction, the second cross member 45B restricts crush deformation of the first cross member 45A to the predetermined amount or more. As a result, application of a large load from members around the battery cells 51 in the battery pack 28 is suppressed.

As described above, in the vehicle body lower structure of the embodiment, the battery cross members 45 disposed in the battery pack 28 include the first cross member 45A and the second cross member 45B extending further outward than the first cross member 45A in the vehicle width direction. For this reason, when an impact load from a side of the vehicle body is input, energy of an impact load can be sufficiently absorbed by the second cross member 45B, and the battery cells 51 can be reliably protected by the first cross member 45A.

In addition, in the vehicle body lower structure of the embodiment, the first cross member 45A is constituted by a member having a higher strength in the vehicle width direction than that of the second cross member 45B. For this reason, when an impact load from a side of the vehicle body is input, the second cross member 45B having low strength in the vehicle width direction is deformed first to securely absorb energy of an impact load, and then, the first cross member 45A having high strength in the vehicle width direction restricts inward excessive deformation of the battery pack 28 or the second cross member 45B in the vehicle width direction. Accordingly, when the vehicle body lower structure of the embodiment is employed, sufficient absorption of the energy of an impact load and secure protection of the battery cells 51 in the battery pack 28 can also be achieved.

Further, in the vehicle body lower structure of the embodiment, the notch section 56 that forms a weak section is provided on an end portion of the second cross member 45B on an outer side in the vehicle width direction. For this reason, when an impact load is input to an end portion of the second cross member 45B on an outer side in the vehicle width direction from a side of the vehicle body, the notch section 56 triggers deformation, and the second cross member 45B easily crushes and deforms in the vehicle width direction. Accordingly, when this configuration is employed, the energy of an impact load can be more reliably absorbed by the second cross member 45B.

In addition, in the vehicle body lower structure of the embodiment, the first flanges 45AF extending toward front and rear sides of the vehicle body extend from the end portions of the first cross member 45A on outer sides in the vehicle width direction, and the first flanges 45AF are fixed to the bottom wall 28Aa of the battery pack 28. For this reason, the first cross member 45A has end portions on outer sides in the vehicle width direction that are strongly fixed to the bottom wall 28Aa of the battery pack 28 at the first flanges 45AF extending in the vehicle body forward/rearward direction. Accordingly, when this configuration is employed, even when the extension length of the first cross member 45A in the vehicle width direction is smaller than the extension length of the second cross member 45B, an input load from a side of the vehicle body can be firmly received by the first cross member 45A.

In addition, in the vehicle body lower structure of the embodiment, the second flanges 45BF extending toward front and rear sides of the vehicle body extend from the end portions of the second cross member 45B on outer sides in the vehicle width direction, and the second flanges 45BF are fixed to the sidewalls 50 of the battery pack 28. For this reason, when an impact load is input to the sidewalls 50 of the battery pack 28 on outer sides in the vehicle width direction from a side of the vehicle body, the impact load can be stably transmitted to the second cross member 45B through the second flanges 45BF.

Accordingly, when this configuration is employed, the second cross member 45B can be stably deformed when an impact load is input.

In addition, when an impact load input from a side of the vehicle body is relatively small, large deformation of the sidewalls 50 of the battery pack 28 on outer sides in the vehicle width direction toward an inner side in the vehicle width direction can be restricted by the second flanges 45BF. Accordingly, when this configuration is employed, it is possible to minimize contact of the sidewalls 50 of the battery pack 28 with the battery cells 51 and protect the battery cells 51.

Further, in the vehicle body lower structure of the embodiment, the first flanges 45AF of the first cross member 45A have an extension length in the vehicle body forward/rearward direction that is set to be larger than that of the second flanges 45BF of the second cross member 45B. For this reason, the attachment strength of the first flanges 45AF with respect to the bottom wall 28Aa of the battery pack 28 can be made larger than the attachment strength of the second flanges 45BF with respect to the sidewalls 50 of the battery pack 28. Accordingly, when this configuration is employed, even when an impact load input from a side of the vehicle body is large, excessive deformation of the battery pack 28 can be reliably restricted by the first cross member 45AF, and the battery cells 51 can be reliably protected.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A vehicle body lower structure comprising:
    a pair of left and right side sills disposed below a side portion of a vehicle body and extending substantially in a vehicle body forward/rearward direction;
    a battery pack configured to accommodate a battery cell therein and having both end portions in a vehicle width direction fixed to the side sills while being disposed below a floor panel; and
    a battery cross member that is disposed inside the battery pack substantially in the vehicle width direction and that extends further outward in the vehicle width direction than the battery cell inside of the battery pack,
    wherein the battery cross member comprises a first cross member and a second cross member extending further outward in the vehicle width direction than the first cross member,
    the first cross member and the second cross member are arranged in parallel substantially along the vehicle width direction,
    an extension length of the second cross member in the vehicle width direction is set longer than an extension length of the first cross member in the vehicle width direction, and
    the extension length of the first cross member is set to a length in which the first cross member does not reach a sidewall of the battery pack on an outer side in the vehicle width direction.

2. The vehicle body lower structure according to claim 1, wherein the first cross member is constituted by a member having a higher strength in the vehicle width direction than that of the second cross member.

3. The vehicle body lower structure according to claim 1, wherein a weak section is provided on an end portion of the second cross member on an outer side in the vehicle width direction.

4. The vehicle body lower structure according to claim 1, wherein the first cross member has a first flange that extends in the vehicle body forward/rearward direction from an end portion of the first cross member on an outer side in the vehicle width direction and fixed to a bottom wall of the battery pack.

5. The vehicle body lower structure according to claim 1, wherein the second cross member has a second flange extending in the vehicle body forward/rearward direction from an end portion of the second cross member on an outer side in the vehicle width direction and fixed to the sidewall of the battery pack on the outer side in the vehicle width direction.

6. The vehicle body lower structure according to claim 5, wherein the first cross member has a first flange that extends in the vehicle body forward/rearward direction and that is fixed to a bottom wall of the battery pack, and
    the first flange is formed to have an extension length in the vehicle body forward/rearward direction larger than that of the second flange.

* * * * *